Patented July 18, 1950

2,516,012

UNITED STATES PATENT OFFICE 2,516,012

RESINOUS PRODUCTS

Herbert F. Minter and Fritz J. Nagel, Pittsburgh, Pa., assignors to Westinghouse Electric Corporation, East Pittsburgh, Pa., a corporation of Pennsylvania No Drawing. Application April 3, 1946, Serial No. 659,416

4 Claims. (Cl. 260—44)

This invention relates to novel resinous compositions characterized by a relatively short drying time which, when cured, form tough and flexible films having an excellent flex life at elevated temperatures.

It has been found that resinous compositions of unsaturated alkyd resins combined with polyhydric phenol-formaldehyde resins form cured resinous products having outstanding physical properties. In order to accelerate the curing of these mixed resinous compositions, metallic driers may be added, but tests indicate that the cured compositions are detrimentally affected in that the thermal resistance, as determined by flex life at elevated temperatures, is reduced.

The object of this invention is to produce a relatively fast-drying resinous composition comprising unsaturated alkyd resin and polyhydric phenolic resin that produces cured resinous products characterized by an outstanding flex life, toughness, and other physical properties.

A further object of this invention is to provide a relatively fast-drying resinous composition composed of a 1,3 polyhydroxy benzene formaldehyde resin, an unsaturated alkyd resin, a complex unsaturated organic ester and a metallic drier.

Other objects of the invention will, in part, be obvious and will, in part, appear hereinafter.

The resinous compositions of this invention comprise as the major ingredient an unsaturated alkyd resin and a minor proportion of the resinous reaction product of certain 1,3 polyhydroxy benzenes with formaldehyde. To this composition, there is added a complex unsaturated ester in an amount of from 1% to 30% of the combined weight of the unsaturated alkyd and the polyhydroxy benzene formaldehyde reaction product. Metallic driers, in an amount of from 0.01% to 2% of the weight of the resinous solids, may be added to provide for fast drying and curing. Relatively volatile solvents may be added to provide solutions for various applications.

Unsaturated alkyd resins may be prepared from unsaturated polybasic organic acids and polyhydric alcohols, the polyhydric alcohols being either saturated or unsaturated. Suitable unsaturated polybasic organic acids are maleic acid, maleic anhydride, citraconic acid, aconitic acid, and fumaric acid, or derivatives thereof capable of forming esters with alcohols, such as maleyl chloride. The polyhydric alcohols, for example, may be ethylene glycol, diethylene glycol, propylene glycol, glycerol, pentaerythritol, and the like. For most purposes, the polyhydric alcohol and polybasic acid are reacted in substantially stoichiometric proportions providing approximately a carboxyl group or its equivalent for each hydroxyl group in the alcohol. However, these proportions may be departed from to some extent. The alkyd resin, however, should not be combined with an oil or fatty acids derived therefrom, because the properties are adversely affected and furthermore, since such oil products have been found not to be compatible with the polyhydroxy benzene-formaldehyde resin.

The polyhydroxy benzene formaldehyde reaction products have been fully described in the copending patent application of F. J. Nagel, one of the inventors of the present application, Serial No. 639,431, filed January 5, 1946, now Patent 2,477,641, and entitled "Resinous Compositions and Method of Preparing the Same," and assigned to the assignee of the present invention. Briefly, the resinous reaction product is produced by reacting a polyhydroxy benzene having the formula:

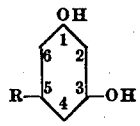

where R may be hydrogen, hydroxyl, halogen, or an aliphatic not more than one substituent from the group for the radical and having hydrogen radicals at the 2, 4, 6 positions, and an anhydrous aldehyde selected from the group consisting of formaldehyde and its polymers. Examples of the polyhydroxy benzenes having the above unit formula are resorcinol, orcinol pyrogallol, 1,3 dihydroxyl-5 chlorobenzene, 1,3-dihydroxy-4-chlorobenzene, 3,5-dihydroxy benzoic acid, and 1,3 dihydroxy-5 methyl benzene. Suitable formaldehyde polymers are paraformaldehyde, trioxane and polyoxymethylenes. The mole proportions of the aldehyde to the polyhydroxy benzene may vary from 0.9 to 1.5. For most purposes, excellent results are obtained by using substantially equimolar proportions of anhydrous formaldehyde and polyhydroxy benzene. The polyhydroxy benzene and the anhydrous aldehyde are reacted under substantially anhydrous conditions in the presence of substantially non-reactive liquid solvent having a boiling temperature of below 100° C., the solvent having less than 2% water, and the solvent including a substantial proportion of anhydrous methanol, the whole functioning both as a solvent and reaction medium. Suitable non-reactive solvents are ethanol, butanol, ethyl acetate and isopropanol. The methanol must constitute a substantial proportion of the ingredients in the reaction vessel. The solvent should have a major proportion of methanol to provide methanol in an amount equal to at least 25% of the total weight of polyhydroxy benzene, aldehyde and solvent. Anhydrous methanol in an amount of from 25% to 40% of the weight of the solids being reacted is sufficient to control the reaction, though more may be employed. A catalyst in an amount of from 0.01% to 1% or more, depending on its activity, is added to the reaction mixture. Suitable catalysts are ammonia, hydrochloric acid, phosphoric acid, ethylene diamine, and acetic acid. The proportions of catalyst are set forth in considerable detail in the above-identified copending application of F. J. Nagel. The reaction temperature is not permitted to rise above the reflux temperature of the methanol solvent. Under these conditions, the reaction of the 1,3 polyhydroxy benzene and aldehyde occurs smoothly and may be easily controlled. An intermediate resinous reaction product is produced that is in the A-stage and is capable of reacting further. The product is soluble in methanol and a considerable proportion of the solvent should consist of methanol in order that it be stable and resist deterioration on standing.

The solution of polyhydroxy benzene-formaldehyde resin may be combined with the unsaturated alkyd resin in the proportion of 100 parts of alkyd resin solids to from 5 to 50 parts of polyhydroxy benzene-formaldehyde resin. This composition, however does not dry and cure as rapidly as may be desired in some cases. If a metallic drier, such, for example, as cobalt naphthenate, is added to the composition to promote faster drying and curing, it has been found that certain undesirable features may occur; for instance the composition in the cured state is not nearly as thermally stable as the same composition cured without the metallic drier. A reduction to as much as one-third in flex life occurs when a metallic drier is employed in the composition.

However, if the above composition is combined with certain complex unsaturated esters, metallic driers may be added in order to secure the benefits of faster drying and curing without impairing the flex life and other physical properties. These complex unsaturated esters may be designated as the diester of a monohydric hydrocarbon alcohol and an acid half ester of a saturated paraffinic polyhydric alcohol and a dibasic acid selected from the group consisting of fumaric acid, maleic acid and citraconic acid. These complex esters are prepared by reacting a polyhydric alcohol with sufficient unsaturated dibasic organic acid to provide a molecule of dibasic acid for each hydroxyl group in the polyhydric alcohol. An acid half-ester is produced by the reaction. Examples of suitable polyhydric alcohols are ethylene glycol, propylene glycol, diethylene glycol, glycerol, pentaerythritol, hexamethylene glycol and trimethylene glycol; while suitable unsaturated dibasic acids are maleic acid, maleic anhydride, fumaric acid, citraconic acid, and citraconic anhydride. Thereafter the acid half-ester of the unsaturated acid and polyhydric alcohol is reacted with sufficient monohydric alcohol, either saturated or unsaturated, to provide a hydroxyl group for each free carboxyl group in the acid half-ester. Suitable monohydric alcohols are ethanol, methanol, propanol, allyl alcohol, methallyl alcohol and benzyl alcohol. Typical complex unsaturated esters are:

$\omega,\omega'$-Dimethyl ethylene maleate
$\omega,\omega'$-Diallyl ethylene maleate
$\omega,\omega'$-Dibenzyl ethylene maleate
$\omega,\omega'$-Diallyl propylene maleate
Tri-(monoallyl maleate) glyceride The proportion of the complex unsaturated ester to secure the desired properties in the above composition may vary from 1% to 30% of the combined weight of the unsaturated alkyd and polyhydroxy benzene-formaldehyde resin. Upon combining the three ingredients in the proportions given, a metallic drier may be added in the proportion of about 0.01% to 2% of the weight of the solid resinous materials. Suitable metallic driers are cobalt naphthenate, lead naphthenate, zinc naphthenate, cobalt linolenate, lead resinate, and cadmium tungate. Such metallic driers are well known in the art and no further extended list need be given. Usually, the driers are prepared as a finely-suspended or dissolved material in mineral spirits.

The following examples illustrate the invention, all parts being by weight:

Example I

| | Parts |
|---|---|
| Diethylene glycol-glyceryl-maleate-sebacate (50% solids in toluene and hexone) | 100 |
| Resorcinol-formaldehyde resin (60% solids in methanol) | 20 |
| $\omega,\omega'$-Diethyl ethylene maleate | 10 |
| Metallic drier | 1 |

The metallic drier in each example was a mixture of cobalt naphthenate, lead naphthenate and zinc naphthenate in mineral spirits in a concentration of about 6%. The above ingredients were thoroughly mixed and formed a clear, red solution. The composition, when applied to metal sheets as a coating, baked to a fully cured state in one hour at 150° C. The coating was extremely tough. Films of the resin have an unusual flex life at elevated temperatures.

Example II

| | Parts |
|---|---|
| Diethylene glycol-glyceryl-maleate-sebacate (50% solids in toluene and hexone) | 100 |
| Resorcinol-formaldehyde resin (60% solids in methanol) | 20 |
| $\omega,\omega'$-Diallyl propylene maleate | 10 |
| Metallic drier | 1 |

The composition formed a clear red solution which could be baked in one hour at 150° C. to a fully cured coating.

Example III

| | Parts |
|---|---|
| Glyceryl-maleate-sebacate (50% solids) | 100 |
| Resorcinol-formaldehyde resin (60% solids) | 10 |
| $\omega,\omega'$-Dimethyl ethylene maleate | 15 |
| Metallic drier | 2 |

The addition of the complex unsaturated esters in all of the above examples enabled the production of cured resinous products in a relatively short baking time without, however, impairing the thermal flex life of the products. Without the complex unsaturated esters the compositions would suffer a substantial decrease in thermal resistance.

The compositions of the present invention may be employed for coatings on various base materials, such as metals, ceramics, and the like. The compositions may be also employed as dipping and impregnating varnishes for treating electrical members and other apparatus. They have exhibited utility as adhesives and binders for uniting metallic laminations in producing magnetic cores and the like. Laminated products may be prepared from paper and cloth impregnated with the compositions and treated by heating under pressure. The cured resins are extremely tough without being brittle.

The resin compositions, such as those in the examples given above, may be modified by adding thereto various pigments, fillers, extenders, or dyes, in order to secure predetermined viscosity, color, and other characteristics.

Since certain changes may be made in the above invention and different embodiments of the invention may be made without departing from the scope thereof, it is intended that all matter contained in the above-described disclosure shall be interpreted as illustrative and not in a limiting sense.

We claim as our invention:

1. A relatively fast-curing resinous composition comprising as its essential ingredients (a) 100 parts by weight of an unsaturated alkyd resin derived by reacting in substantially stoichiometric proportions an acidic compound selected from the group consisting of maleic acid, aconitic acid, citraconic acid and fumaric acid, their anhydrides and their acyl chlorides, and a polyhydric alcohol, (b) from 5 to 50 parts by weight of the partially reacted resinous product of 1 mole of a polyhydroxy benzene having the unit formula

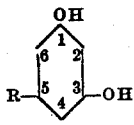

where R is a radical selected from the group consisting of hydrogen, hydroxyl, halide, carboxyl and aliphatic radicals and having not more than one substituent selected from this group for hydrogen in the 2, 4, 6 positions, and from 0.9 to 1.5 moles of an anhydrous aldehyde selected from the group consisting of formaldehyde and its polymers, the reaction between the polyhydroxy benzene and the aldehyde being carried out in a substantially anhydrous, liquid, non-reactive solvent having a boiling point not in excess of 100° C., the solvent having less than 2% water, the solvent comprising as its major constituent methanol in an amount equal to at least 25% of the combined weight of polyhydroxy benzene, aldehyde and solvent, the reaction temperature being maintained not in excess of the reflux temperature of the solvent, in the presence of a catalyst for the reaction, (c) from 1% to 30%, based on the combined weight of the unsaturated alkyd resin and the polyhydroxy benzene-aldehyde reaction product, of a diester of a monohydric hydrocarbon alcohol and an acid half ester of a saturated paraffinic polyhydric alcohol and a dibasic acid selected from the group consisting of maleic acid, fumaric acid and citraconic acid, and (d) a metallic drier in the amount of from 0.01% to 2% of the weight of ingredients (a), (b) and (c).

2. A relatively fast-curing resinous composition comprising as its essential ingredients (a) 100 parts by weight of an unsaturated alkyd resin derived by reacting in substantially stoichiometric proportions an acidic compound selected from the group consisting of maleic acid, aconitic acid, citraconic acid and fumaric acid, their anhydrides and their acyl chlorides, and a polyhydric alcohol, (b) from 5 to 50 parts by weight of the partially reacted resinous product of 1 mole of a polyhydroxy benzene having the unit formula

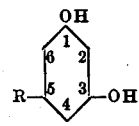

where R is a radical selected from the group consisting of hydrogen, hydroxyl, halide, carboxyl and aliphatic radicals and having not more than one substituent selected from this group for hydrogen in the 2, 4, 6 positions, and from 0.9 to 1.5 moles of an anhydrous aldehyde selected from the group consisting of formaldehyde and its polymers, the reaction between the polyhydroxy benzene and the aldehyde being carried out in a substantially anhydrous, liquid, non-reactive solvent having a boiling point not in excess of 100° C., the solvent having less than 2% water, the solvent comprising as its major constituent methanol in an amount equal to at least 25% of the combined weight of polyhydroxy benzene, aldehyde and solvent, the reaction temperature being maintained not in excess of the reflux temperature of the solvent, in the presence of a catalyst for the reaction, (c) from 1% to 30%, based on the combined weight of the unsaturated alkyd resin and the polyhydroxy benzene-aldehyde reaction product, of a diester of a monohydric hydrocarbon alcohol and an acid half ester of a saturated paraffinic polyhydric alcohol and a dibasic acid selected from the group consisting of maleic acid, fumaric acid and citraconic acid, (d) a metallic drier in the amount of from 0.01% to 2% of the weight of ingredients (a), (b) and (c), and a volatile organic solvent for the ingredients (a), (b) and (c).

3. A relatively fast-curing resinous composition comprising as its essential ingredients (a) 100 parts by weight of an unsaturated alkyd resin derived by reacting in substantially stoichiometric proportions an acidic compound selected from the group consisting of maleic acid, aconitic acid, citraconic acid and fumaric acid, their anhydrides and their acyl chlorides, and a polyhydric alcohol, (b) from 5 to 50 parts by weight of the partially reacted product of 1 mole of resorcinol, and from 0.9 to 1.5 moles of an anhydrous aldehyde selected from the group consisting of formaldehyde and its polymers, the reaction between the resorcinol and the aldehyde being carried out in a substantially anhydrous, liquid, non-reactive solvent having a boiling point not in excess of 100° C., the solvent having less than 2% water, the solvent comprising as its major constituent methanol in an amount equal to at least 25% of the combined weight of the resorcinol, aldehyde and solvent, the reaction temperature being maintained not in excess of the reflux temperature of the solvent, in the presence of a catalyst for the reaction, (c) from 1% to 30%, based on the combined weight of the unsaturated alkyd resin and the resorcinol-aldehyde reaction product, of a diester of a monohydric hydrocarbon alcohol and an acid half ester of a saturated paraffinic polyhydric alcohol and a dibasic acid selected from the group consisting of maleic acid, fumaric acid and citraconic acid, and (d) a metallic drier in the amount of from 0.01% to 2% of the weight of ingredients (a), (b) and (c).

4. A relatively fast-curing resinous composition comprising as its essential ingredients (a) 100 parts by weight of an unsaturated alkyd resin derived by reacting in substantially stoichiometric proportions an acidic compound selected from the group consisting of maleic acid, aconitic acid, citraconic acid and fumaric acid, their anhydrides and their acyl chlorides, and a polyhydric alcohol, (b) from 5 to 50 parts by weight of the partially reacted product of 1 mole of resorcinol, and from 0.9 to 1.5 moles of an anhydrous aldehyde selected from the group consisting of formaldehyde and its polymers, the reaction between the resorcinol and the aldehyde being carried out in a substantially anhydrous, liquid, non-reactive solvent having a boiling-point not in excess of 100° C., the solvent having less than 2% water, the solvent comprising as its major constituent methanol in an amount equal to at least 25% of the combined weight of the resorcinol, aldehyde and solvent, the reaction temperature being maintained not in excess of the reflux temperature of the solvent, in the presence of a catalyst for the reaction, (c) from 1% to 30%, based on the combined weight of the unsaturated alkyd resin and the resorcinol-aldehyde reaction product, of a diester of a monohydric hydrocarbon alcohol and an acid half ester of a saturated paraffinic polyhydric alcohol and a dibasic acid selected from the group consisting of maleic acid, fumaric acid and citraconic acid, and (d) a metallic drier in the amount of from 0.01% to 2% of the weight of ingredients (a), (b) and (c), and a volatile solvent for the ingredients (a), (b) and (c).

HERBERT F. MINTER.
FRITZ J. NAGEL.

REFERENCES CITED

The following references are of record in the file of this patent:

UNITED STATES PATENTS

| Number | Name | Date |
|---|---|---|
| 1,802,390 | Novotny | Apr. 28, 1931 |
| 2,409,633 | Kropa | Oct. 22, 1946 |
| 2,414,415 | Rhodes | Jan. 14, 1947 |
| 2,443,740 | Kropa | June 22, 1948 |
| 2,477,641 | Nagel | Aug. 2, 1949 |